US009842559B2

(12) United States Patent
Yamaguchi et al.

(10) Patent No.: US 9,842,559 B2
(45) Date of Patent: Dec. 12, 2017

(54) DISPLAY DEVICE

(71) Applicant: Sharp Kabushiki Kaisha, Osaka-shi, Osaka (JP)

(72) Inventors: Takahiro Yamaguchi, Osaka (JP); Yuhichiroh Murakami, Osaka (JP); Yasushi Sasaki, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 148 days.

(21) Appl. No.: 14/761,031

(22) PCT Filed: Jan. 14, 2014

(86) PCT No.: PCT/JP2014/050412
§ 371 (c)(1),
(2) Date: Jul. 15, 2015

(87) PCT Pub. No.: WO2014/112459
PCT Pub. Date: Jul. 24, 2014

(65) Prior Publication Data
US 2015/0356940 A1 Dec. 10, 2015

(30) Foreign Application Priority Data
Jan. 18, 2013 (JP) .................................. 2013-007476

(51) Int. Cl.
*G09G 3/36* (2006.01)
*G02F 1/1345* (2006.01)
(52) U.S. Cl.
CPC ....... *G09G 3/3688* (2013.01); *G02F 1/13454* (2013.01); *G09G 3/3648* (2013.01);
(Continued)

(58) Field of Classification Search
CPC .............. G09G 3/3688; G09G 3/3648; G09G 2300/0426; G09G 2300/0452;
(Continued)

(56) References Cited

U.S. PATENT DOCUMENTS

2005/0117611 A1* 6/2005 Shin ..................... G09G 3/325
370/536
2009/0091523 A1* 4/2009 Fujita .................. G09G 3/3688
345/87

(Continued)

FOREIGN PATENT DOCUMENTS

JP 64-84297 A 3/1989
JP 2009-224869 A 10/2009

*Primary Examiner* — Amare Mengistu
*Assistant Examiner* — Jennifer Zubajlo
(74) *Attorney, Agent, or Firm* — Keating & Bennett, LLP

(57) ABSTRACT

A demultiplexer circuit (12) of a display device according to one aspect of the present invention includes signal input lines (Vn), control lines (BSW, GSW, and RSW), and sampling transistors (13R2, 13G2, and 13B1). Sampling transistors connected to one signal input line includes first and second sampling transistors. A first sampling transistor (13B1) includes a control electrode (17) which branches to a first branch part (17a) and a second branch part (17b), either one of an input electrode (15) and an output electrode (18) that are disposed between a first branch part (17a) and a second branch part (17b), and other one of an input electrode (15) and an output electrode (18) that are disposed outside of a first branch part (17a) and a second branch part (17b).

13 Claims, 8 Drawing Sheets

(52) U.S. Cl.
CPC .............. *G09G 2300/0426* (2013.01); *G09G 2300/0452* (2013.01); *G09G 2300/0809* (2013.01); *G09G 2310/0235* (2013.01); *G09G 2310/0297* (2013.01)

(58) Field of Classification Search
CPC ... G09G 2300/0809; G09G 2310/0235; G09G 2310/0297; G02F 1/13454
See application file for complete search history.

(56) References Cited

U.S. PATENT DOCUMENTS

2009/0167648 A1* 7/2009 Jeon ..................... G09G 3/3233
345/76
2009/0273388 A1* 11/2009 Yamashita ........... G09G 3/3648
327/416

* cited by examiner

DISPLAY DEVICE

TECHNICAL FIELD

This invention relates to a display device.

The present application claims priority based on Japanese patent application No. 2013-007476 filed in Japan on Jan. 18, 2013 and incorporates by reference herein the content thereof.

BACKGROUND ART

A display device such as a liquid crystal display device having a data driver IC supplying a video signal to a plurality of data lines of a display unit has been known. If, for example, the number of output terminals of the data driver IC is smaller than the number of data lines, a demultiplexer circuit is used to time division distribute to a plurality of data lines the video signal output from one terminal of the data driver IC. Display devices providing a demultiplexer circuit have been disclosed in the following Patent Documents 1 and 2.

PRIOR ART DOCUMENTS

Patent Documents

[Patent Document 1] Japanese Patent Application Publication No. S64-84297 (1989)
[Patent Document 2] Japanese Patent Application Publication No. 2009-224869

SUMMARY OF THE INVENTION

Problem to be Solved by the Invention

Patent Document 2, for example, discloses one example of a demultiplexer circuit having one input terminal, seven output terminals, twelve transistors controlled by a control signal that is connected between the input terminal and the output terminals and supplied to three control terminals. The twelve transistors include two or three transistors arranged in the vertical direction with respect to the same output terminals or four transistors arranged in the horizontal direction with respect to the same control terminals.

When designing the patterning for such a demultiplexer circuit, an increase in the surface area occupied thereby has been a problem. When designing a display device, it is desirable to narrow a frame part not contributing to the display. However, an increase of the surface area occupied by the demultiplexer circuit leads to an increase in the size of the frame part of the display device. In the present specification, making the frame part of the display device narrow will be referred to as frame narrowing.

One embodiment of the present invention has been made to solve the above-noted problem and has as an object the provision of a display device that reduces the surface area occupied by the demultiplexer circuit and that enables frame narrowing.

Means to Solve the Problem

To achieve the above-described object, a display device of one aspect of the present invention includes: a display unit in which M data lines (where M is a natural number) and N gate lines (where N is a natural number) mutually intersect, the display unit being provided with an M-by-N dots matrix corresponding to intersections between the data lines and the gate lines; a data driver that outputs a video signal; a demultiplexer circuit that distributes by time division video signal output from the data driver to the M data lines; and a gate driver that outputs a scanning signal to the N gate lines, wherein the demultiplexer circuit includes m signal input lines (where m is a natural number and m<M) to which the video signal is input, k control lines (where k is a natural number and k=M/m) to which a control signal is input, and M sampling transistors connected between the signal input lines and the data lines, the k sampling transistors connected the one signal input line includes a first sampling transistor and a second sampling transistor, the first sampling transistor includes a control electrode including a first branch part and a second branch part, either one of an input electrode and an output electrode that are disposed between the first branch part and the second branch part, and another one of an input electrode and an output electrode that are disposed outside of the first branch part and the second branch part, and the input electrode is connected to the signal input line, and the output electrode is connected to the data lines.

In the display device of one aspect of the present invention, the second sampling transistor may include a control electrode that extends along a straight line, an input electrode that is disposed at one side of the control electrode, and an output electrode that is disposed at another side of the control electrode.

In the display device of one aspect of the present invention, the first sampling transistor and the second sampling transistor may be disposed at different positions in a direction of extension of the data lines.

In the display device of one aspect of the present invention, the first sampling transistor may be disposed at a position relatively close to the control lines, and the second sampling transistor may be disposed at a position relatively distant from the control lines, and the output electrode may be disposed between the first branch part and the second branch part, and the input electrode may be disposed outside of the first branch part and the second branch part.

In the display device of one aspect of the present invention, the second sampling transistor may be constituted by a plurality of sampling transistors arranged in a direction of extension of the control lines.

In the display device of one aspect of the present invention, sampling transistors neighboring in a direction of extension of the control lines may share the input electrode.

In the display device of one aspect of the present invention, the second sampling transistor may be constituted by a plurality of sampling transistors arranged in a direction of extension of the data lines.

In the display device of one aspect of the present invention, the first sampling transistor may be disposed at a position relatively distant from the control lines, and the second sampling transistor may be disposed at a position relatively close to the control lines, and the input electrode may be disposed between the first branch part and the second branch part, and the output electrode may be disposed outside of the first branch part and the second branch part.

In the display device of one aspect of the present invention, the second sampling transistor may be constituted by a plurality of sampling transistors arranged in a direction of extension of the control lines.

In the display device of one aspect of the present invention, the k may be 3, the k control lines may be a red dot control line, a green dot control line, and a blue dot control line, and one pixel may be constituted by a red dot, a green dot and a blue dot.

Effect of the Invention

One embodiment of the present invention enables reduction of the surface area occupied by a demultiplexer circuit and enables implementation of a display device that achieves frame narrowing.

EMBODIMENT(S) FOR CARRYING OUT THE INVENTION

First Embodiment

The first embodiment of the present invention will be described using FIG. 1 to FIG. 3.

The present embodiment will be described, with reference made to the example of a liquid crystal display device as a display device.

Figure 1:
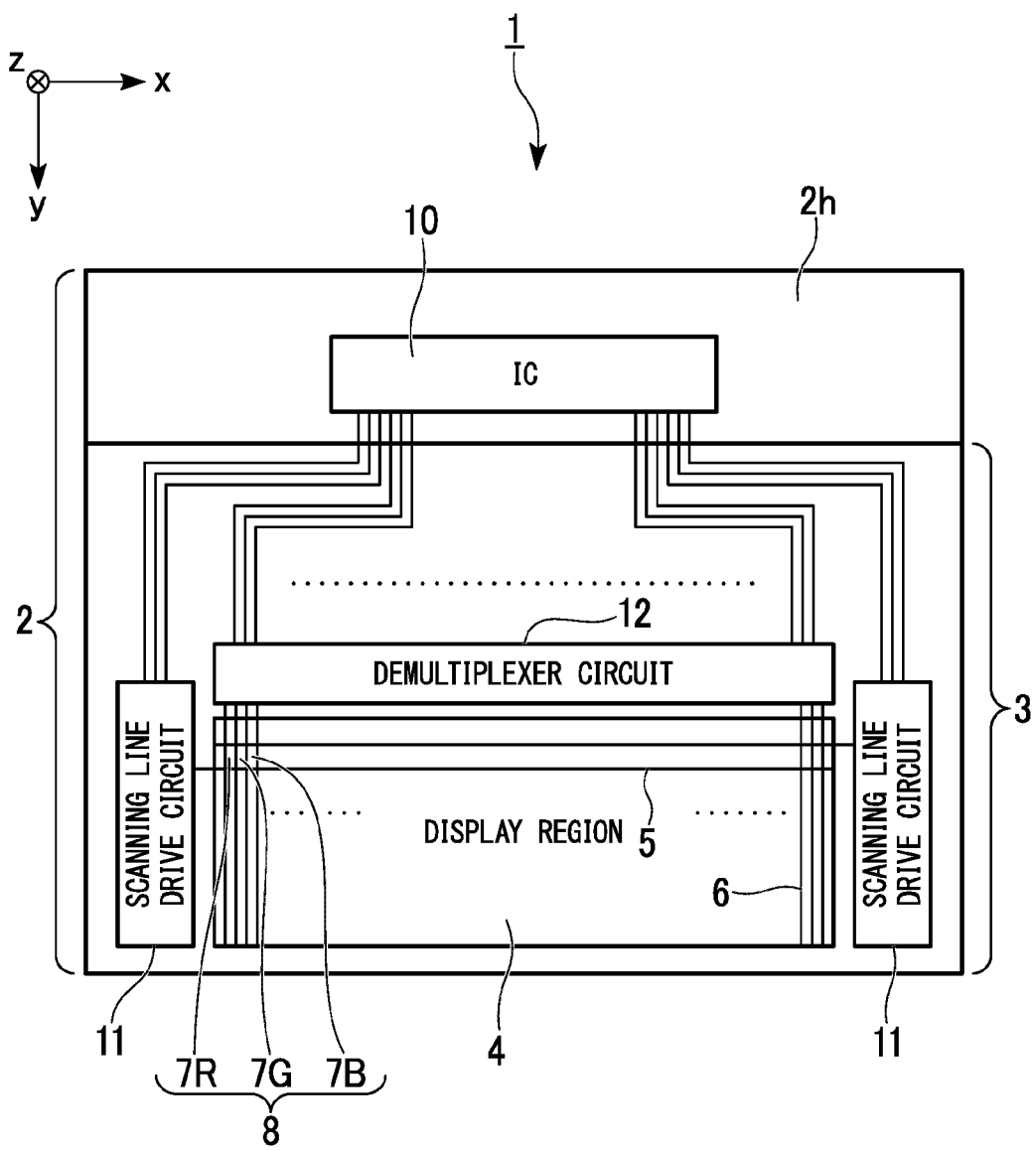
FIG. 1 is a plan view showing the entire construction of the display device of the first embodiment.

FIG. 1 is a plan view showing the overall construction of the display device of the present embodiment. FIG. 2 is an equivalent circuit of the demultiplexer circuit. FIG. 3 is a plan view, showing the pattern of the demultiplexer circuit.

In the drawings discussed below, the dimensional scales might be changed depending on the constituent elements, in order to make some constituent elements easier to see.

As shown in FIG. 1, a liquid crystal display device 1 of the present embodiment has an array substrate 2, an opposing substrate 3, a sealing material (not shown) adhering the array substrate 2 and the opposing substrate 3 to each other with a prescribed spacing therebetween, and a liquid crystal layer (not shown) sealed into a space surrounded by the array substrate 2, the opposing substrate 3 and a sealing material. In addition to the forgoing the liquid crystal display device 1 has a backlight and a pair of polarizing sheets and the like. Because the transmission-type-liquid crystal display device is of well-known construction, however, the descriptions and illustrations thereof will be omitted.

A display region 4 has a plurality of gate lines 5 and a plurality of data lines 6. The plurality of gate lines 5 are arranged in parallel with each other and extend in one direction (x-axis direction in FIG. 1). The plurality of data lines 6 are arranged in parallel with each other and extend in a direction perpendicular to the direction of extension of the gate lines 5 (y-axis direction in FIG. 1). Regions surrounded by the neighboring gate lines 5 and the neighboring gate lines 6 form the red (R) dots 7R, the green (G) dots 7G, and blue (B) dots 7B, respectively.

Three dots of 7R, 7G, and 7B, for R, G, and B constitute one pixel 8. Thin film transistors (hereinafter abbreviated TFT, not shown) for the purpose of pixel switching are provided in the vicinity of points of intersection between the gate lines 5 and the data lines 6. An image electrode (not shown) is connected to the gate lines 5 and the data lines 6 via the TFTs. The display region 4 is equivalent to a display unit recited in the claims.

In the display region 4 of the present embodiment, M data lines 6 (where M is a natural number) and N gate lines 5 (where N is a natural number) mutually intersect, providing an M-by-N dot matrix corresponding to intersections between the data lines 6 and the gate lines 5. If, for example, the number of pixels of the display region 4 is 640 in the horizontal direction and 480 in the vertical direction, the number of data lines 6 is 1920 (640×3), and the number of gate lines 5 is 480.

A shape of the array substrate 2 and the opposing substrate 3 are both rectangles when seen in plan view. The length of one side of the array substrate 2 (side extending in the y-axis direction) is longer than that of the corresponding side of the opposing substrate 3. The upper edge of the array substrate 2 thus extends beyond the upper edge of the opposing substrate 3. Of the array substrate 2, the part extending beyond the opposing substrate 3 will be called as an extending part 2h. A data driver 10 is mounted on the extending part 2h of the array substrate 2. The data driver 10 has a function of supplying a video signal to the data lines 6 of the display region 4. The data driver 10 is mounted on the array substrate 2 in the form of, for example, an IC chip. The data driver 10 has a plurality of functional blocks, including a shift register. However, because this is well known configuration, the description thereof will be omitted.

Scanning line drive circuits 11 (gate drivers) are provided along the right and left sides of the array substrate 2. The scanning line drive circuit 11 has a function of supplying a scanning signal to the gate lines 5 of the display region 4. Of a plurality of gate lines 5 of the display region 4, for example, seen from the above, even-numbered gate lines 5 are connected to the scanning line drive circuit 11 on the right side, and odd-numbered gate lines 5 are connected to the scanning line drive circuit 11 on the left side. The scanning line drive circuit 11 includes a multi-staged shift register (not shown), and the shift register, for example, includes TFTs (not shown) monolithically formed on the array substrate.

A demultiplexer circuit 12 is provided between the plurality of data lines 6 and the data driver 10. The demultiplexer circuit 12 has a function of distributing by time division the video signal output from one of the output terminals of the data driver 10 to the plurality of data lines 6.

Figure 2:
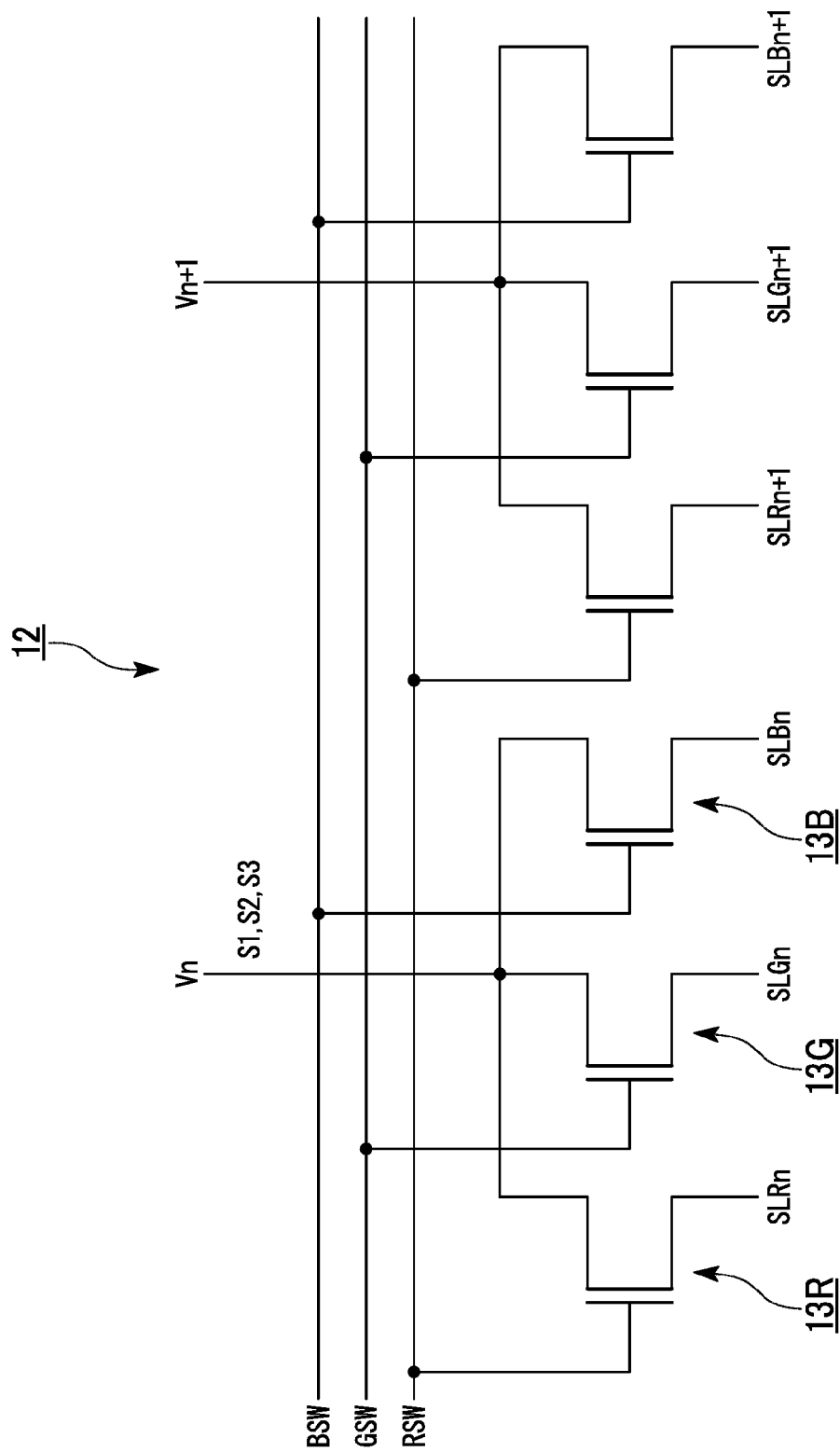
FIG. 2 is an equivalent circuit diagram of the demultiplexer circuit.

As shown in FIG. 2, the demultiplexer circuit 12 has m signal input lines Vn and Vn+1 (where m is a natural number and m<M), k control lines BSW, GSW, and RSW (where k is a natural number and in the present embodiment k=3 and k=M/m), and M (which is the same as the number of data lines 6), sampling transistors 13R, 13G, and 13B. A video signal is input to the signal input lines Vn and Vn+1. Control signal that control the on/off operation of the sampling transistors 13R, 13G, and 13B are input to the control lines BSW, GSW, and RSW. The sampling transistors 13R, 13G, and 13B are connected between the signal input lines Vn and Vn+1 and the data lines SLRn, SLGn. SLBn, SLRn+1, SLGn+1, and SLBn+1.

Of the m signal input lines of the demultiplexer circuit 12, FIG. 2 shows only the part of the circuitry related to the n-th signal input line Vn and the (n+1)th signal input line Vn+1.

Also, in order to distinguish each data line 6, symbols SLRn, SLGn, SLBn, SLRn+1, SLGn+1, and SLBn+1 will be applied thereto.

For example, video signals S1, S2, and S3 to be supplied to each of the three data lines SLRn, SLGn, and SLBn are serially input to the signal input line Vn. Additionally, control signals having pulses with rising edges at different times, which switch on the sampling transistors 13R, 13G, and 13B are input to the three control lines BSW, GSW, and RSW, respectively. This successively switches the sampling transistor 13R, the sampling transistor 13G, and the sampling transistor 13B on, thereby distributing the video signals S1, S2, and S3 by time division to the three data lines SLRn, SLGn, and SLBn respectively. The same is done regarding the signal input line Vn+1.

Figure 3:
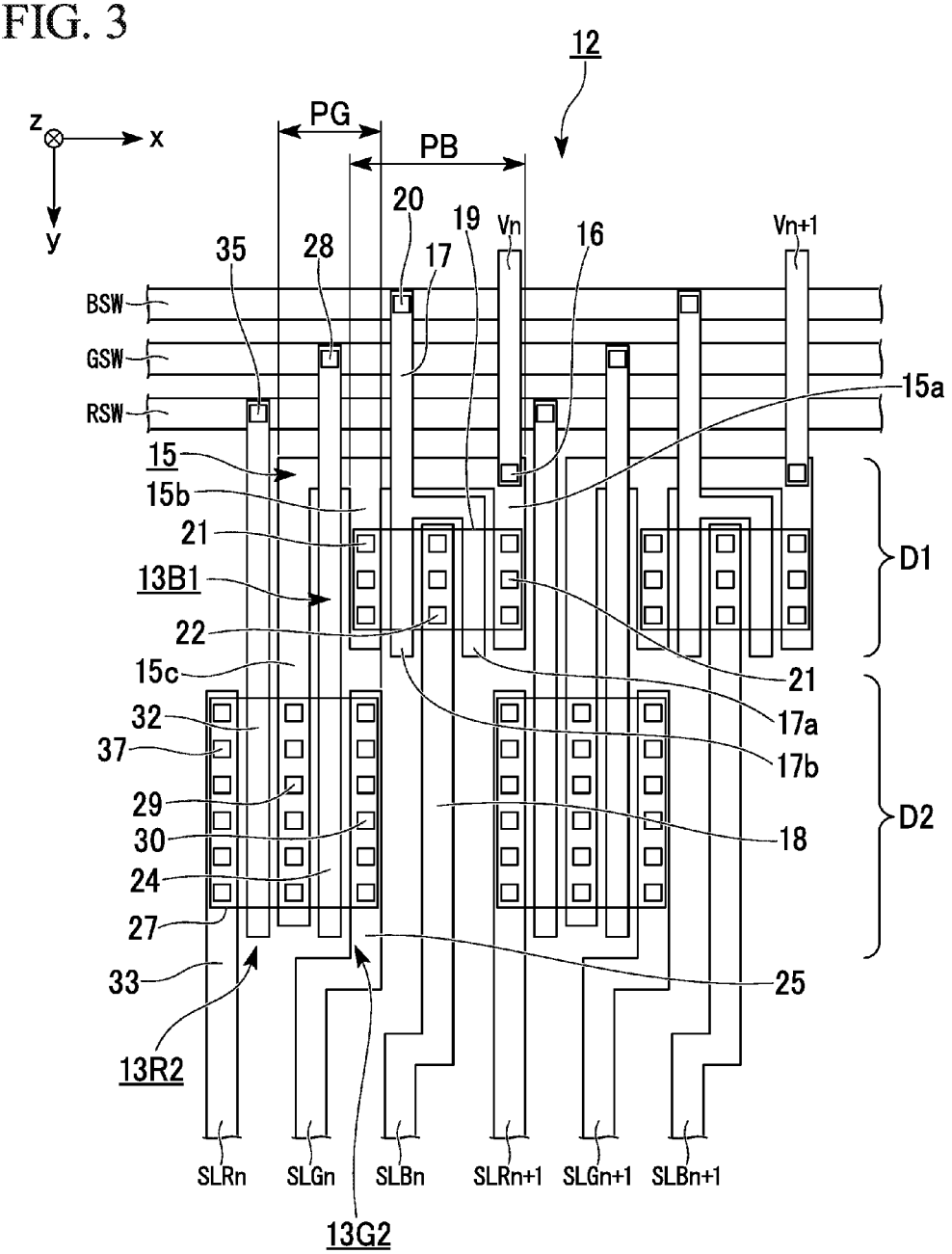
FIG. 3 is a plan view showing the pattern of the demultiplexer circuit of the first embodiment.

FIG. 3 shows one example of an actual pattern of the demultiplexer circuit 12 shown in the equivalent circuit diagram of FIG. 2.

As shown in FIG. 3, the three control lines BSW, GSW, and RSW are arranged in parallel with each other and extend in the x direction. The signal input lines Vn and Vn+1 are oriented perpendicularly to the control lines BSW, GSW, and RSW.

Because the circuit connected to the signal input line Vn and the circuit connected to the signal input line Vn+1 are repetitions of the same pattern, the pattern of the circuit connected to the signal input line Vn will be representationally used in the description. One of the sampling transistors 13B1, 13R2, and 13G2 is connected between each of the control lines BSW, GSW, and RSW and each of data lines SLRn, SLGn, and SLBn.

To simplify the following descriptions, a sampling transistor will be referred to simply as a transistor. A transistor, specifically, may be a thin-film transistor (hereinafter, TFT) formed monolithically on the array substrate 2. In the following, the control electrode, the input electrode, and the output electrode correspond, respectively, to the gate, the source, and the drain of the TFT.

The circuit pattern connected to the signal input line Vn has a total of three transistors, 13B1, 13R2, and 13G2. In the case of the present embodiment, the three transistors 13B1, 13R2, and 13G2 include the first transistor 13B1 that has a branched control electrode and the second transistors 13R2 and 13G2 that each has a control electrode arranged along a straight line. The first transistor 13B1 is disposed at a position relatively close to the control lines BSW, GSW, and RSW, and the second transistors 13R2 and 13G2 are disposed at positions relatively distant from the control lines BSW, GSW, and RSW. In the following, the positions of the transistors will be described as D1 level and D2 level in sequence from the close side to the far side with respect to the control lines BSW, GSW and RSW.

An input electrode 15 is connected to the signal input line Vn via a contact 16. The input electrode 15 has a first branch part 15a, a second branch part 15b, and a third branch part 15c extending to the formation regions of each of transistors 13B1, 13R2, and 13G2 and functions as an input electrode common to the three transistors 13B1, 3R2, and 13G2.

The first blue transistor 13B1 at level D1 is connected to the data line SLBn supplying a video signal to the blue dots. The first blue transistor 13B1 has a control electrode 17 branching to a first branch part 17a and a second branch part 17b, an output electrode 18 disposed between the first branch part 17a and the second branch part 17b, the first branch part 15a and the second branch part 15b of the input electrode 15 disposed outside of the first branch part 17a and the second branch part 17b, and a semiconductor layer 19.

The control electrode 17 is connected to the blue dot control line BSW via a contact 20. The semiconductor layer 19 is provided so as to straddle the first branch part 17a and the second branch part 17b of the control electrode 17, is connected to the first branch part 15a and second branch part 15b of the input electrode 15 via a plurality of contacts 21, and is also connected to the output electrode 18 via a plurality of contacts 22.

The second green transistor 13G2 at level D2 is connected to the data line SLGn supplying a video signal to the green dots. The second green transistor 13G2 has a control electrode 24 extending along a straight line, an output electrode 25 disposed at one end of the control electrode 24, the third branch part 15c of the input electrode 15 disposed at the other end of the control electrode 24, and a semiconductor layer 27.

The control electrode 24 is connected to the green dot control line GSW via a contact 28. The semiconductor layer 27 is provided so as to straddle the control electrode 24 and the control electrode 32 of the second red transistor 13R2 to be described later, is connected to the third branch part 15c of the input electrode 15 via a plurality of contacts 29, and is also connected to the output electrode 25 via a plurality of contacts 30.

The second red transistor 13R2 at level D2 is connected to the data line SLRn supplying a video signal to the red dots, having a control electrode 32 extending along a straight line, an output electrode 33 disposed at one end of the control electrode 32, the third branch part 15c of the input electrode 15 disposed at the other end of the control electrode 32, and a semiconductor layer 27.

The control electrode 32 is connected to the red dot control line RSW via a contact 35. The semiconductor layer 27 is provided so as to straddle the control electrode 32 and the control electrode 24 and is connected to the output electrode 33 via a plurality of contacts 37.

As described above, the second green transistor 13G2 and the second red transistor 13R2 at level D2 are arranged along the direction of extension (x direction) of the control lines BSW, GSW, and RSW. The second green transistor 13G2 and the second red transistor 13R2 share the input electrode 15 (the third branch part 15c) and the semiconductor layer 27. The second branch part 15b of the input electrode 15 of the first blue transistor 13B1 and a part of the output electrode 25 of the second green transistor 13G2 are arranged along the same straight line extending in the direction of extension (y direction) of the data lines. By doing this, the part PB occupied by the first blue transistor 13B1 in the x direction and the part PG occupied by the second blue transistor 13G2 in the x direction partially overlap.

Consider the case of the demultiplexer circuit of the first comparative example.

Figure 7:
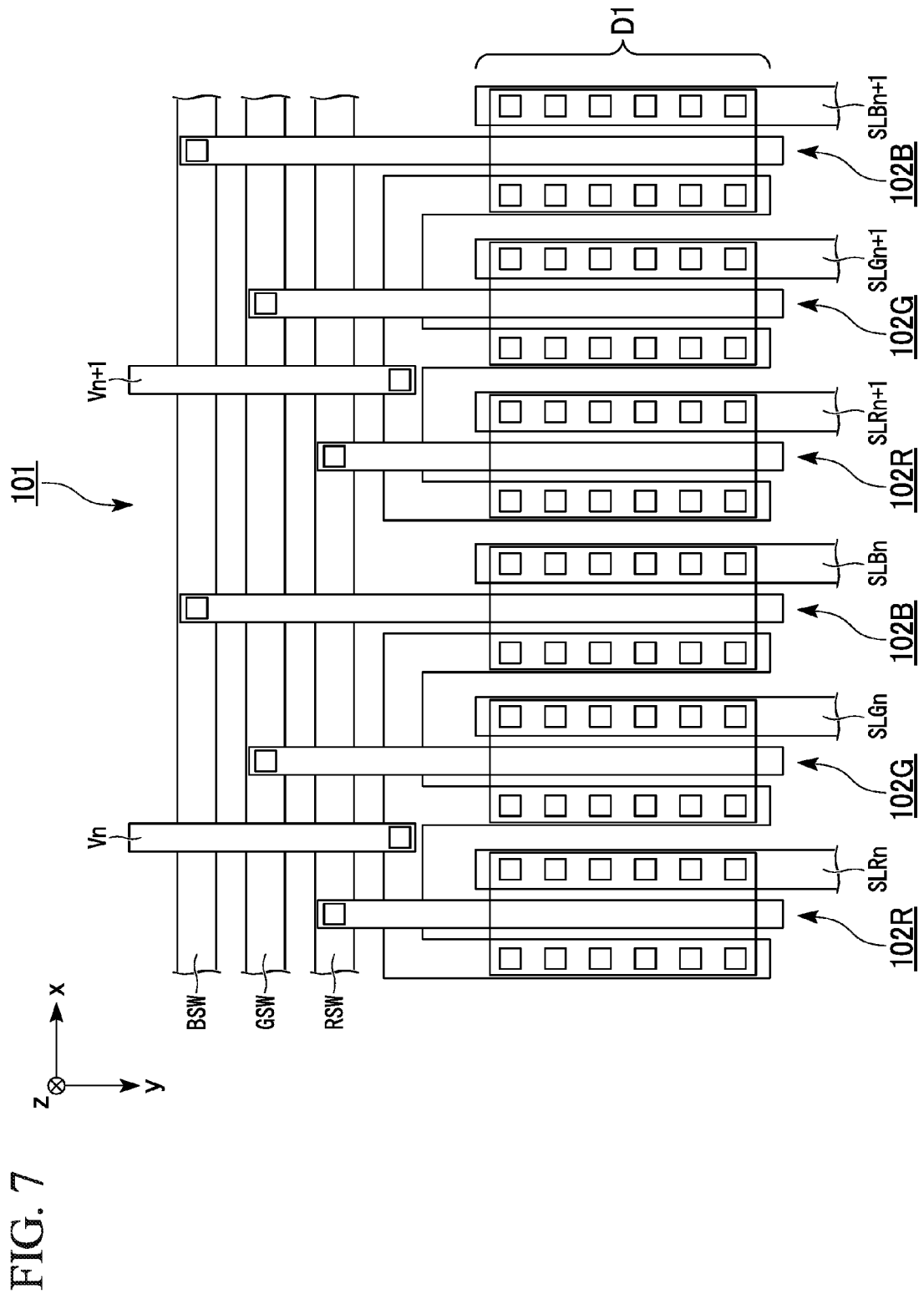
FIG. 7 is a plane view showing the pattern of the demultiplexer circuit of a first comparative example.

As shown in FIG. 7, in a demultiplexer circuit 101 of the first comparative example, all the transistors 102R, 102G, and 102B are arranged along a straight line in the direction of extension (x direction) of the control lines BSW, GSW, and RSW. In FIG. 7, with the exception of transistors 102R, 102G, and 102B, constituent elements that are in common with those in FIG. 3 of the present embodiment are assigned the same reference symbols. This arrangement becomes difficult to use if it causes the overall dimension of the circuit in the direction of extension (x direction) of the control lines BSW, GSW, and RSW to become very large, so that the dot-to-dot pitches (data line pitches) becomes narrow.

Next, a demultiplexer circuit of a second comparative example, in which a part of a plurality of transistors is arranged in the vertical direction instead of arranging them in one horizontal row will be considered.

Figure 8:
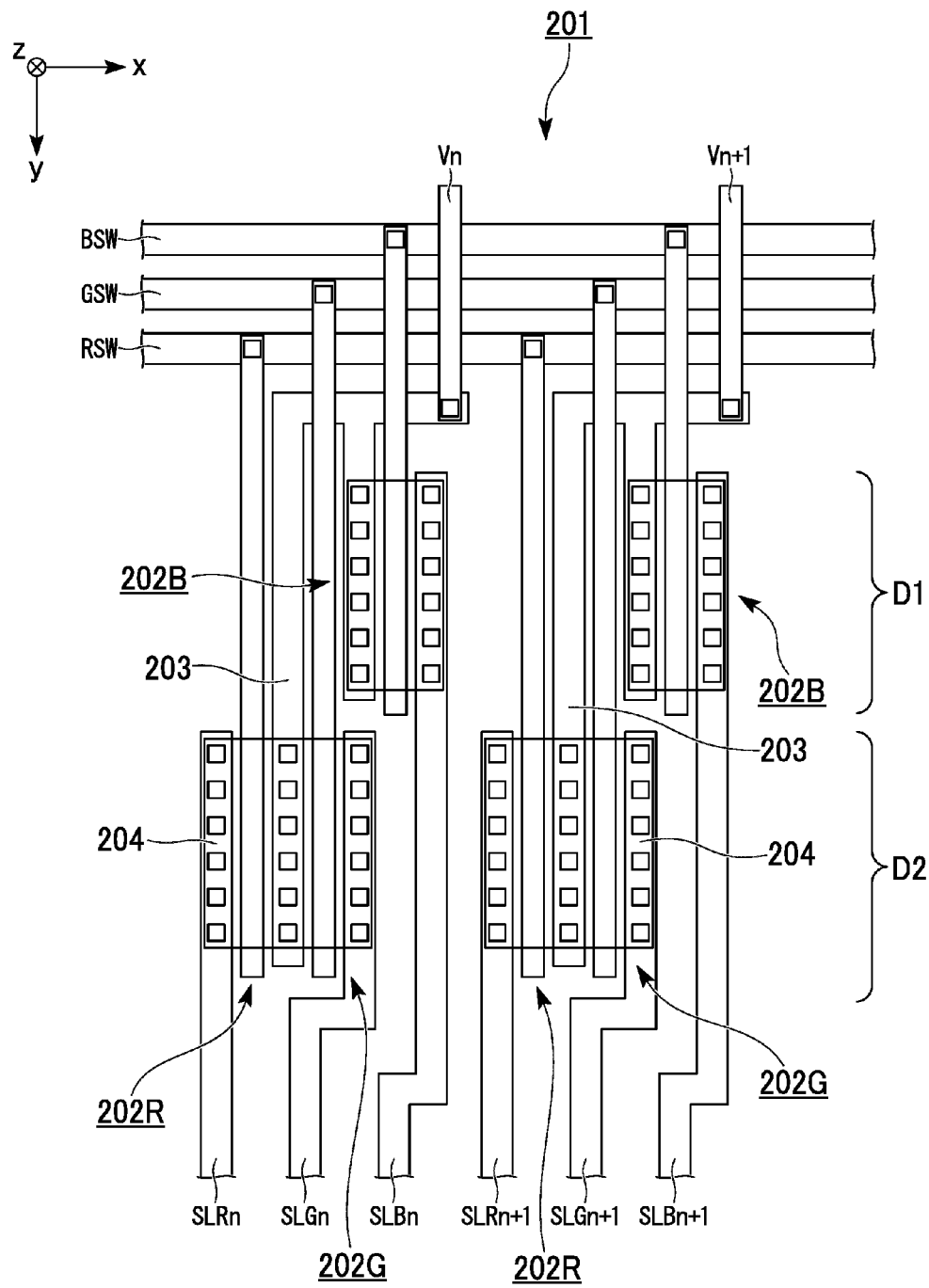
FIG. 8 is a plan view showing the pattern of the demultiplexer circuit of a second comparative example.

As shown in FIG. 8, in the demultiplexer circuit 201 of the second comparative example, a plurality of transistors 202R, 202G, and 202B are separated into the two levels of D1 and D2. In FIG. 8, with the exception of transistors 202R, 202G, and 202B, constituent elements that are in common with those in FIG. 3 of the present embodiment are assigned the same reference symbols. In this example, a blue transistor 202B is disposed at level D1, and a green transistor 202G and a red transistor 202R are disposed at level D2. Although the green transistor 202G and the red transistor 202R share the input electrode 203 and the semiconductor layer 204, all of the blue transistor 202B, the green transistor 202G, and the red transistor 202R have the same shapes and sizes. If the size in the y directions of each of the transistors 202R, 202G, and 202B is taken to be, for example, 100 μm, the overall size in the y direction of the demultiplexer circuit 201 is approximately 200 μm.

As shown in FIG. 3, however, in the demultiplexer circuit 12 of the present embodiment, the control electrode 17 of the first blue transistor 13B1 is branched and makes a series connection between a transistor having the first branch part 15a of the input electrode 15 and the output electrode 18, which are disposed at both sides of the first branch part 17a of the control electrode 17, and a transistor having the second branch part 15b of the input electrode 15 and the output electrode 18, which are disposed at both sides of the second branch part 17b of the control electrode 17. By forming the first blue transistor 13B1 in this manner, even if its size in the y direction is made one-half compared to the size of other transistor, there is no difference in either the effective channel width or the driving capacity relative to the other transistors. The same driving capacity as the transistor described in the above-noted second comparative example can thus be implemented by a transistor having a size in the y direction of 50 μm.

As a result of this, the size in the y direction of a transistor part at level D1 is approximately 50 μm, the size in the y direction of a transistor part level D2 is approximately 100 μm, and the overall size in the y direction of the demultiplexer circuit 12 becomes approximately 150 μm. That is, the size in the y direction of the demultiplexer circuit 12 of the present embodiment in FIG. 3 is approximately 50 μm shorter than the demultiplexer circuit 201 of the second comparative example in FIG. 8.

By doing this, according to the demultiplexer circuit 12 of the present embodiment, combining the first blue transistor 13B1 having the branched control electrode 17, the second green transistor 13G2 having the linearly shaped control electrode 24, and the second red transistor 13R2 having the linearly shaped control electrode 32 enables a reduction of the occupied surface area of the demultiplexer circuit 12 and implementation of frame narrowing of the liquid crystal display device 1.

Although, in the present embodiment, the transistor having the branched control electrode is made to be used for the blue transistor and the transistor having the linearly shaped control electrode is made to be used for the green transistor and for the red transistor, there is not a restriction on the structure. The transistor having the branched control electrode may be used for any of the blue transistor, the green transistor, and the red transistor, in which case the transistor having the linearly shaped control electrode may be used for the other transistors.

Second Embodiment

The second embodiment of the present invention will be described, with references made to FIG. 4.

The basic structure of the liquid crystal display device of the present embodiment is the same as in the first embodiment, the transistor structure of the demultiplexer circuit differs from that of the first embodiment.

Figure 4:
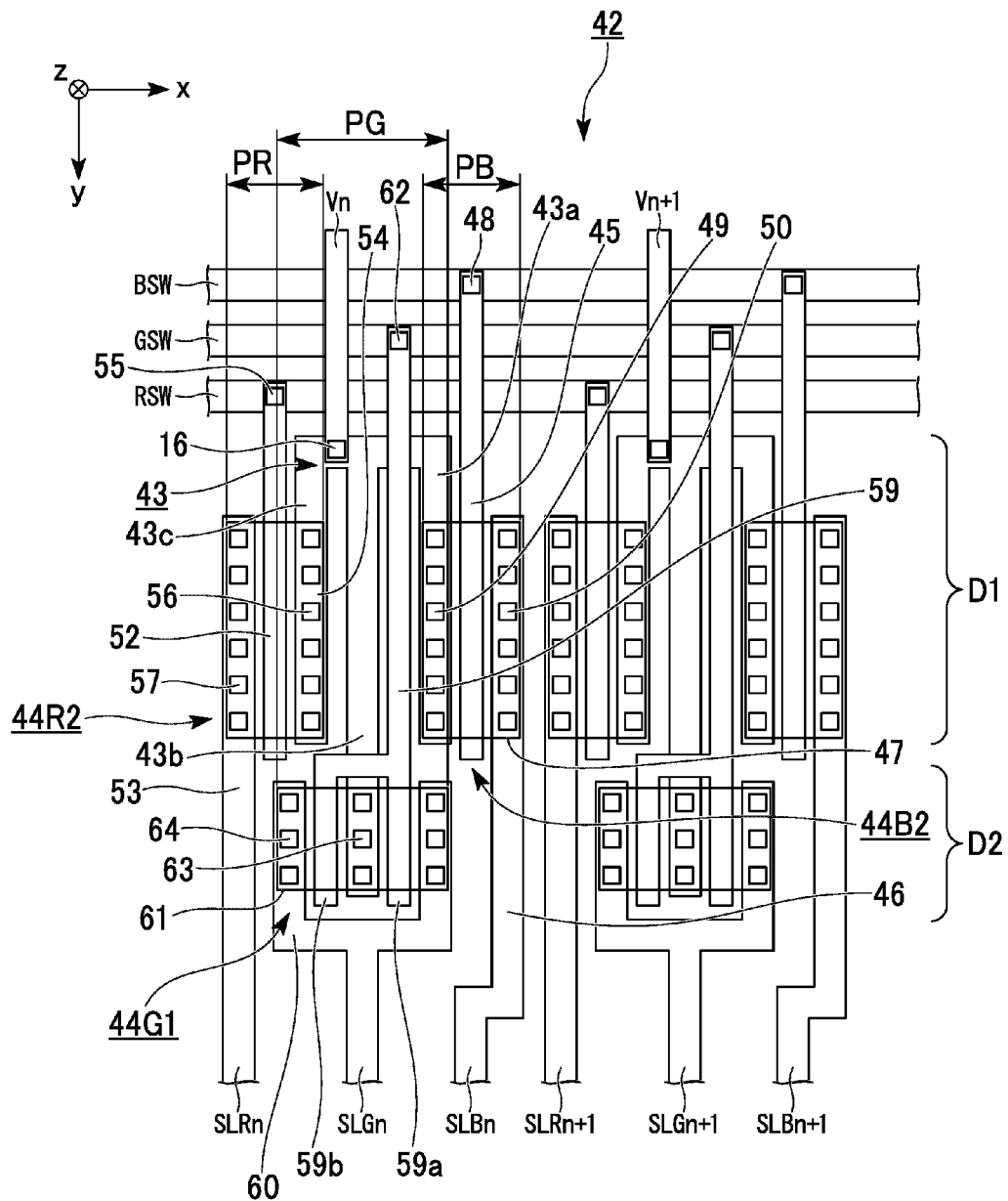
FIG. 4 is a plan view showing the pattern of the demultiplexer circuit of the second embodiment.

FIG. 4 is a plan view showing the pattern of the demultiplexer circuit of the present embodiment.

In FIG. 4, constituent elements that are in common with those in FIG. 3 of the first embodiment are assigned the same reference symbols, and the detailed description thereof will be omitted.

In a demultiplexer circuit 42 of the present embodiment shown in FIG. 4, an input electrode 43 is connected to the signal input line Vn via the contact 16. The input electrode 43 has a first branch part 43a, a second branch part 43b, and a third branch part 43c extending to the formation regions of each of transistors 44B2, 44R2, and 44G1 and functions as an input electrode common to the three transistors 44B2, 44R2, and 44G1.

In the first embodiment, the transistor having a branched control electrode is disposed at level D1, and the transistor having a linearly shaped control electrode is disposed at level D2. However, the present embodiment differs from the first embodiment in that the transistor having a linearly shaped control electrode is disposed at level D1, and the transistor having a branched control electrode is disposed at level D2.

The second blue transistor 44B2 at D1 level is connected to the data line SLBn supplying a video signal to the blue dots, having a control electrode 45 extending along a straight line, an output electrode 46 disposed at one end of the control electrodes 45, the first branch part 43a of the input electrode 43 disposed at the other end of the control electrode 45, and a semiconductor layer 47.

The control electrode 45 is connected to the blue dot control line BSW via a contact 48. The semiconductor layer 47 is connected to the first branch part 43a of the input electrode 43 via a plurality of contacts 49, and is also connected to the output electrode 46 via a plurality of contacts 50.

The second red transistor 44R2 at level D1 is connected to the data line SLRn supplying a video signal to the red dots, having a control electrode 52 extending along a straight line, an output electrode 53 disposed at one end of the control electrode 52, the third branch part 43c of the input electrode 43 disposed at the other end of the control electrode 52, and a semiconductor layer 54.

The control electrode 52 is connected to the red dot control line RSW via a contact 55. The semiconductor layer 54 is connected to the third branch part 43c of the input electrode 43 via a plurality of contacts 56, and is also connected to the output electrode 53 via a plurality of contacts 56.

A first green transistor 44G1 at level D2 is connected to the data line SLGn supplying a video signal to the green dots. The first green transistor 44G1 has a control electrode 59 branching to a first branch part 59a and a second branch part 59b, a second branch 43b of an input electrode 43 disposed between the first branch part 59a and the second branch part 59b, an output electrode 60 disposed outside of the first branch part 59a and the second branch part 59b, and a semiconductor layer 61.

The control electrode 59 is connected to the green dot control line GSW via a contact 62. The semiconductor layer 61 is provided so as to straddle the first branch part 59a and the second branch part 59b of the control electrode 59, and connected to the second branch part 43b of the input electrode 43 via a plurality of contacts 63, and also connected to the output electrode 60 via a plurality of contacts 64.

The second blue transistor 44B2 and the second red transistor 44R2 at level D1 are arranged along the direction of extension (x direction) of the control lines BSW, GSW, and RSW. The part PB occupied by the second blue transistor 44B2 in the x direction and the part PG occupied by the first green transistor 44G1 in the x direction partially overlap. A part PR occupied by the second red transistor 44R2 in the x direction and the part PG occupied by the first green blue transistor 44G1 in the x direction partially overlap.

According to the demultiplexer circuit 42 of the present embodiment, combing the first green transistor 44G1 having a branched control electrode 59, the second blue transistor 44B2 having a linearly shaped control electrode 45, and the second red transistor 44R2 having a linearly shaped control electrode 52 enables a reduction of the occupied surface area of the demultiplexer circuit 42 and implementation of frame narrowing of the liquid crystal display device.

Although, in the present embodiment, the transistor having the branched control electrode is made to be used for the green transistor and the transistor having the linearly shaped control electrode is made to be used for the blue transistor and the red transistor, this is not a restriction on the structure. The transistor having the branched control electrode may be used for any of the blue transistor, the green transistor or the red transistor, in which case the transistor having the linearly shaped control electrode may be used for the other transistors.

Third Embodiment

The third embodiment of the present invention will be described, with references made to FIG. 5.

The basic structure of the liquid crystal display device of the present embodiment is the same as in the first embodiment, the transistor structure of the demultiplexer circuit differs from that of the first embodiment.

Figure 5:
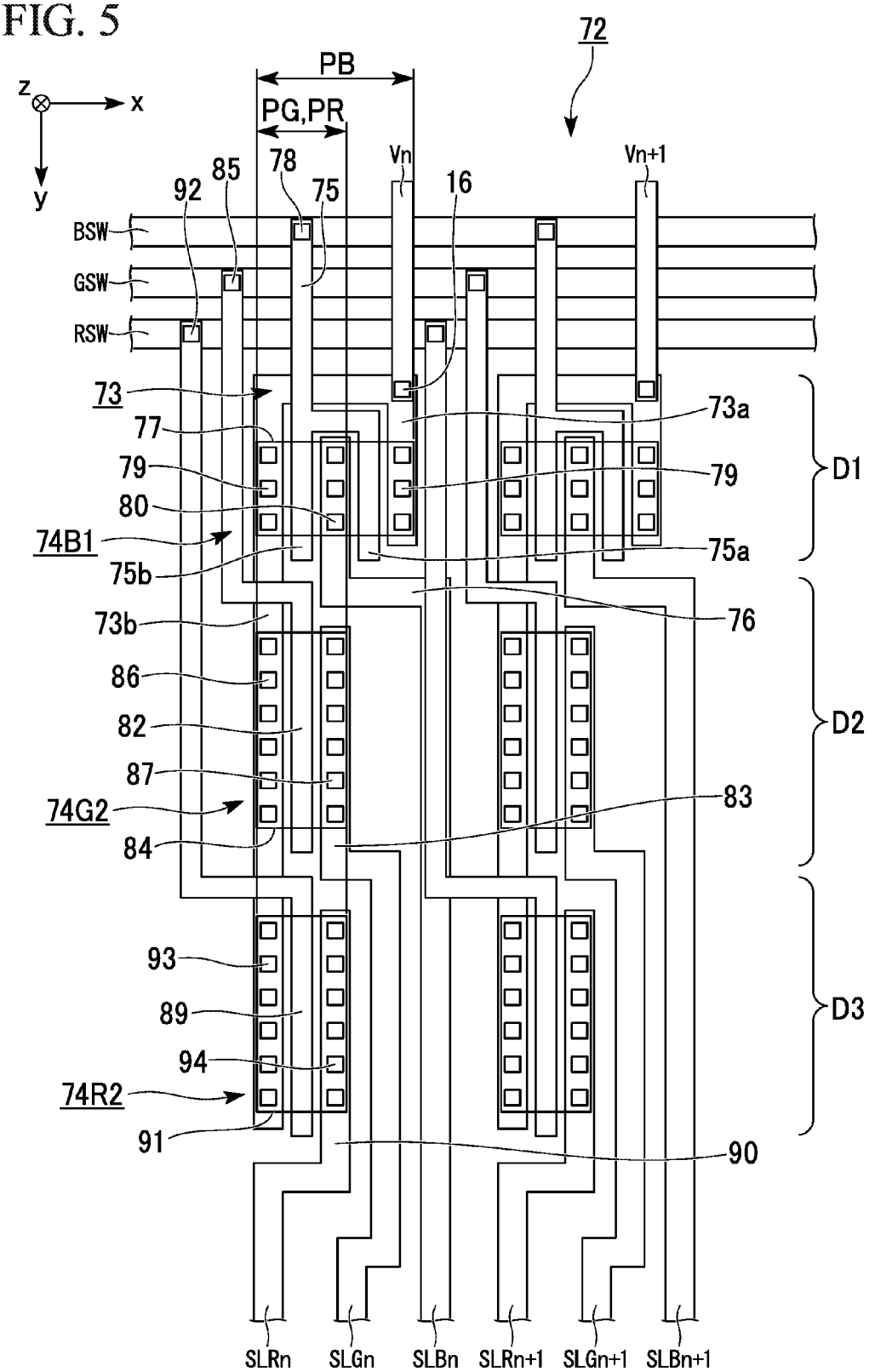
FIG. 5 is a plan view showing the pattern of the demultiplexer circuit of the third embodiment.

FIG. 5 is a plan view showing the pattern of the demultiplexer circuit of the present embodiment.

In FIG. 5, constituent elements that are in common with those in FIG. 3 of the first embodiment are assigned the same reference symbols, and the detailed description thereof will be omitted.

In a demultiplexer circuit 72 of the present embodiment shown in FIG. 5, an input electrode 73 is connected to the signal input line Vn via the contact 16. The input electrode 73 has a first branch part 73a, and a second branch part 73b extending to the formation regions of each of transistors 74B1, 74G2, and 74R2 and functions as an input electrode common to the three transistors 74B1, 74G2, and 74R2.

In the first and second embodiments, the transistor having a branched control electrode and the transistor having a linearly shaped control electrode are disposed at level D1 and level D2. However, the present embodiment differs from the first and second embodiments in that the three transistors 74B1, 74G2, and 74R2 are disposed at three levels. In the present embodiment the positions of transistors will be described as level D1, level D2, and level D3 in sequence from the close side to the far side with respect to the control lines BSW, GSW, and RSW.

The first blue transistor 74B 1 at level D1 is connected to the data line SLBn supplying a video signal to the blue dots. The first blue transistor 74B1 has a control electrode 75 branching to a first branch part 75a and a second branch part 75b, an output electrode 76 disposed between the first branch part 75a and the second branch part 75b, the input electrode 73 disposed outside of the first branch part 75a and the second branch part 75b, and a semiconductor layer 77.

The control electrode 75 is connected to the blue dot control line BSW via a contact 78. The semiconductor layer 77 is provided so as to straddle the first branch part 75a and the second branch part 75b of the control electrode 75, is connected to the first branch part 73a and second branch part 73b of the input electrode 73 via a plurality of contacts 79, and is also connected to the output electrode 76 via a plurality of contacts 80.

The second green transistor 74G2 at level D2 is connected to the data line SLGn supplying a video signal to the green dots. The second green transistor 74G2 has a control electrode 82 extending along a straight line, an output electrode 83 disposed at one end of the control electrode 82, the second branch part 73b of the input electrode 73 disposed at the other end of the control electrode 82, and a semiconductor layer 84.

The control electrode 82 is connected to the green dot control line GSW via a contact 85. The semiconductor layer 84 is connected to the second branch part 73b of the input electrode 73 via a plurality of contacts 86 and is also connected to the output electrode 83 via a plurality of contacts 87.

The second red transistor 74R2 at level D3 is connected to the data line SLRn supplying a video signal to the red dots, having a control electrode 89 extending along a straight line, an output electrode 90 disposed at one end of the control electrode 89, the second branch part 73b of the input electrode 73 disposed at the other end of the control electrode 89, and a semiconductor layer 91.

The control electrode 89 is connected to the red dot control line RSW via a contact 92. The semiconductor layer 91 is connected to the second branch part 73b of the input electrode 73 via a plurality of contacts 93 and is also connected to the output electrode 90 via a plurality of contacts 94.

The second green transistor 74G2 at level D2 and the second red transistor 74R2 at level D3 are arranged along the direction of extension (y direction) of the data lines. The second branch part 73b that will serve as an input electrode common to the three transistors 74B1, 74G2, and 74G2 extends along a straight line. A part of the output electrode 76 of the first blue transistor 74B1, a part of the output electrode 83 of the second green transistor 74G2, and a part of the output electrode 90 of the second red transistor 74R2 are arranged along the same straight line extending in parallel with the direction of extension (y direction) of the data lines.

The connection parts of each output electrode 76, 83, and 90 and each data line have folded shapes so as not to contact each other.

By the above-noted arrangement, the part PG occupied by the second green transistor 74G2 in the x direction and the part PR occupied by the second red transistor 74R2 in the x direction substantially completely overlap. The part PB occupied by the first blue transistor 74B 1 in the x direction, and the part PG occupied by the second green transistor 74G2 in the x direction and part PR occupied by the second red transistor 74R2 in the x direction partially overlap.

According to the demultiplexer circuit 72 of the present embodiment, combining the first blue transistor 74B1 having a branched control electrode 75, the second green transistor 74G2 having a linearly shaped control electrode 82, and the second red transistor 74R2 having linearly shaped control electrode 89 enables a reduction of the occupied surface area of the demultiplexer circuit 72 and implementation of frame narrowing of the liquid crystal display device.

Because in the demultiplexer circuit 72 of the present embodiment the three transistors 74B1, 74G2, and 74R2 are arranged at three levels, the size in the y direction thereof is larger than that of the demultiplexer circuits of the first and second embodiments. However, because the overlapping parts of the occupied parts PB, PG, and PR occupied in the x directions by each transistor 74B1, 74G2, and 74R2 are larger than those of the first and second embodiments, the overall size in the x direction of the demultiplexer circuit 72 becomes smaller than that of the first and second embodiments. Therefore, the demultiplexer circuit 72 of the present embodiment is suitable for application to a liquid crystal display device having data lines with a narrow pitch.

Although in the present embodiment the transistor having a branched control line is applied to the blue transistor at level D1, and the transistor having a linearly shaped control electrode is applied to the green transistor at level D2 and the red transistor at level D3, the shapes and arrangements of the transistors are not restricted to this, and it is possible to make appropriate changes thereto.

Fourth Embodiment

The fourth embodiment of the present invention will be described, with reference made to FIG. 6.

Although the basic structure of a liquid crystal display device of the present embodiment is the same as in the first embodiment, the transistor structure in the demultiplexer circuit differs from that of the first embodiment of FIG. 3.

Figure 6:
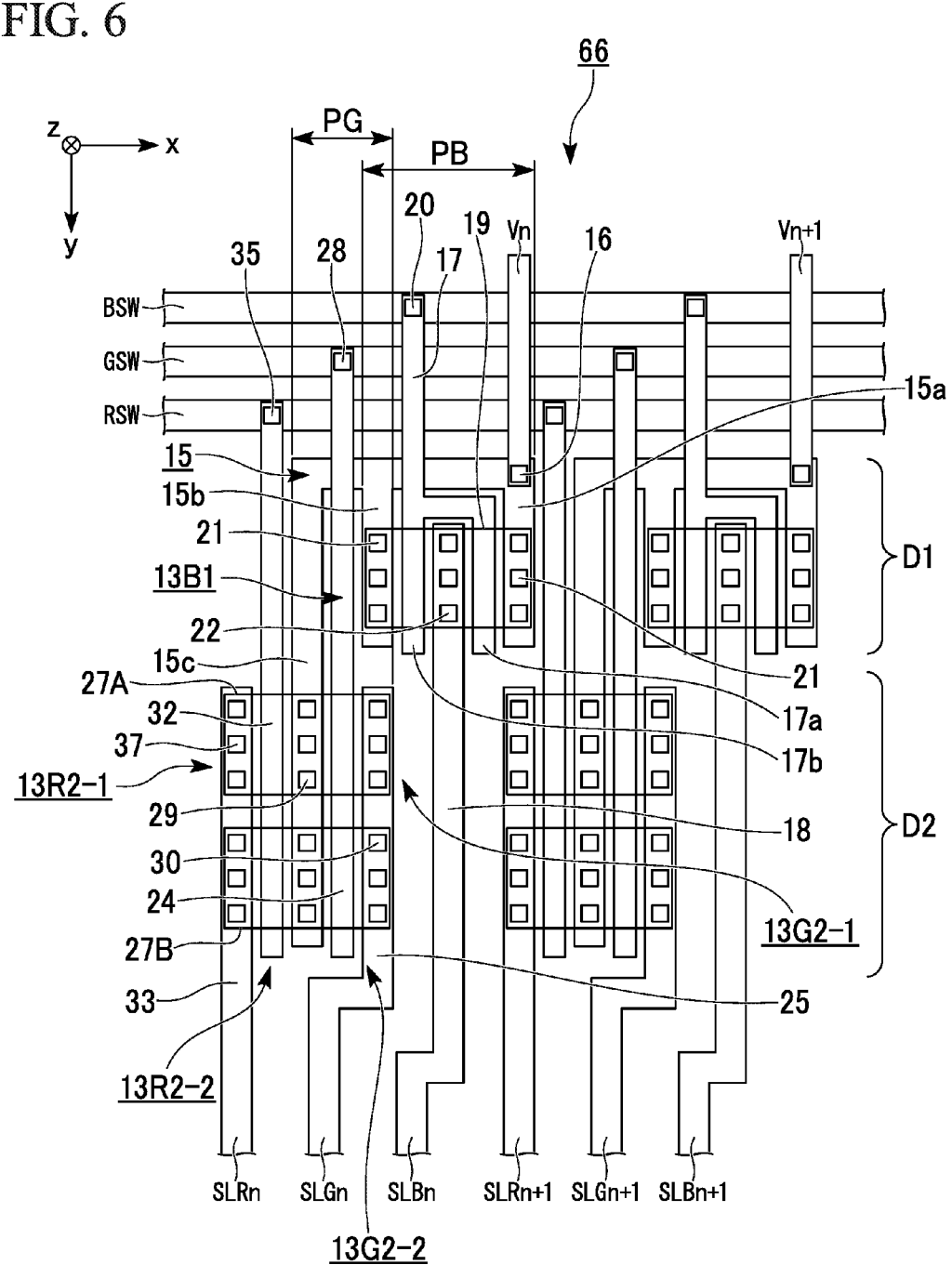
FIG. 6 is a plan view showing of the pattern of the demultiplexer circuit of the fourth embodiment.

FIG. 6 is a plan view showing the pattern of the demultiplexer circuit of the present embodiment.

In FIG. 6, constituent elements that are in common with those in FIG. 3 of the first embodiment are assigned the same reference symbols, and the detailed description thereof will be omitted.

Of a demultiplexer circuit 66 of the present embodiment shown in FIG. 6, the structure of the first blue transistor 13B1 at level D1 is common with that of the demultiplexer circuit 12 of the first embodiment. The constitutions of the second green transistor and the second red transistor at level D2 differ from the demultiplexer circuit 12 of the first embodiment. In the demultiplexer circuit 12 of the first embodiment, each of the second green transistor and the second red transistor is constituted by one transistor having a long dimension in the y direction. In the demultiplexer circuit 66 of the present embodiment, however, each of the second green transistor and the second red transistor is constituted by two transistors that are divided in the y direction.

As shown in FIG. 6, in the demultiplexer circuit 66 in the present embodiment the second green transistor at level D2 has a constitution in which the transistor 13G2-1 having a semiconductor layer 27A and a transistor 13G2-2 having a semiconductor layer 27B are arranged along the y direction. In the same manner, the second red transistor at D2 level has a constitution in which the transistor 13R2-1 having a semiconductor layer 27A and a transistor 13R2-2 having a semiconductor layer 27B are arranged along the y direction. The transistor 13G2-1 and the transistor 13R2-1 share the one semiconductor layer 27A. The transistor 13G2-2 and the transistor 13R2-2 share the one semiconductor layer 27B. Additionally, the structures of the control electrode, the output electrode, the input electrode and the others of the transistors are common with those in the first embodiment.

Also in the demultiplexer circuit 66 of the present embodiment, combining the first blue transistor 13B1 having the branched control electrode 17, the second green transistors 13G2-1 and 13G2-2 having the linearly shaped control electrodes 24, and the second red transistors 13R2-1 and 13R2-2 having linearly shaped control electrodes 32 enables a reduction of the occupied surface area of the demultiplexer circuit 66 and implementation of frame narrowing of the liquid crystal display device, in the same manner as in the first embodiment.

In the present embodiment, although the second green transistors and second red transistors at level D2 are constituted by the two divided transistors, the number of divided transistors is not limited to two.

The technical scope of the present invention is not restricted to that of the above-noted embodiments and can be subjected to various modifications, within the scope of the spirit thereof.

In the above-noted embodiments, for example, although a transistor is designed by formation of connecting an input electrode or output electrode with a semiconductor layer using six contacts, there is no particular restriction to this formation, and the design may be changed as appropriate. Also, it is possible to change lead interconnects as appropriate. Further, there is no restriction to a structure in which a video signal is distributed to three data lines from one signal input line and, for example, when four dots constitute one pixel, a video signal may be distributed from one signal input line to four data lines.

Although an example of a transistor having the end of the control electrode is branched into two and having a first and second branch parts has been described as a first transistor, the number of the branch parts of the control electrode is not restricted to being two, and the control electrode may have three or more branch parts.

The display device of the present invention is not restricted to being a liquid crystal display device, and application is possible to various types of display devices having demultiplexer circuits. The display device of the present invention, for example, may be electronic paper using microcapsules in which white charged particles and black charged particles are sealed. Alternatively, the display device of the present invention may be an organic electroluminescence display device, in which an organic light emitting layer that emits light by charge injection is used as a display medium.

INDUSTRIAL APPLICABILITY

The present invention is usable in various display devises, such as liquid crystal devices, electronic paper, and organic electroluminescence display devices.

DESCRIPTION OF REFERENCE SYMBOLS

1 Liquid display device (Display device)
4 Display region (Display unit)
5 Gate line
6 Data line
10 Data driver
11 Scanning line drive circuit (gate driver)
12, 42, 66, 72 Demultiplexer circuit
13R, 13G, 13B, 13R2, 13R2-1, 13R2-2, 13G2, 13G2-1, 13G2-2, 13B1, 44B2, 44R2, 44G1, 74B1, 74G2, 74R2 Sampling transistor 15, 43, 73 Input electrode
17, 24, 32, 45, 52, 59, 75, 82, 89 Control electrode
17a, 59a, 75a First branch part
17b, 59b, 75b Second branch part
18, 25, 33, 46, 53, 60, 76, 83, 90 Output electrode
Vn, Vn+1 Signal input line
BSW, GSW, RSW Control line
SLRn, SLGn, SLBn, SLRn+1, SLGn+1, SLBn+1 Data line

The invention claimed is:

1. A display device comprising:
   a display in which M data lines (where M is a natural number) and N gate lines (where N is a natural number) mutually intersect, the display being provided with an M-by-N dots matrix corresponding to intersections between the data lines and the gate lines;
   a data driver configured to output a video signal;
   a demultiplexer circuit configured to distribute by time division video signal output from the data driver to the M data lines; and
   a gate driver configured to output a scanning signal to the N gate lines, wherein
   the demultiplexer circuit comprises m signal input lines (where m is a natural number and m<M) to which the video signal is input, k control lines (where k is a natural number and k=M/m) to which a control signal is input, and M sampling transistors connected between the signal input lines and the data lines,
   the k sampling transistors connected the one signal input line comprises a first sampling transistor and a second sampling transistor,
   the first sampling transistor includes:
     a control electrode including:
       a first branch portion that controls the first sampling transistor; and
       a second branch portion that controls the first sampling transistor, either one of an input electrode and an output electrode that are disposed between the first branch portion and the second branch portion, and another one of an input electrode and an output electrode that are disposed outside of the first branch portion and the second branch portion, and
   the input electrode is connected to the signal input line, and the output electrode is connected to the data lines.

2. The display device according to claim 1, wherein the second sampling transistor comprises a control electrode that extends along a straight line, an input electrode that is disposed at one side of the control electrode, and an output electrode that is disposed at another side of the gate lines.

3. The display device according to claim 2, wherein the first sampling transistor and the second sampling transistor are disposed at different positions in a direction of extension of the data lines.

4. The display device according to claim 3, wherein
   the first sampling transistor is disposed at a position relatively close to the control lines, and the second sampling transistor is disposed at a position relatively distant from the control lines, and
   the output electrode is disposed between the first branch portion and the second branch portion, and the input electrode is disposed outside of the first branch portion and the second branch portion.

5. The display device according to claim 4, wherein the second sampling transistor is constituted by a plurality of sampling transistors arranged in a direction of extension of the control lines.

6. The display device according to claim 5, wherein sampling transistors neighboring in a direction of extension of the control lines are configured to share the input electrode.

7. The display device according to claim 4, wherein the second sampling transistor is constituted by a plurality of sampling transistors arranged in a direction of extension of the data lines.

8. The display device according to claim 3, wherein
   the first sampling transistor is disposed at a position relatively distant from the control lines, and the second sampling transistor is disposed at a position relatively close to the control lines, and
   the input electrode is disposed between the first branch portion and the second branch portion, and the output electrode is disposed outside of the first branch portion and the second branch portion.

9. The display device according to claim 8, wherein the second sampling transistor is constituted by a plurality of sampling transistors arranged in a direction of extension of the control lines.

10. The display device according to claim 1, wherein
    the k is 3,
    the k control lines are a red dot control line, a green dot control line, and a blue dot control line, and
    one pixel is constituted by a red dot, a green dot and a blue dot.

11. The display device according to claim 1, wherein
    the control electrode has a shape of a letter "h", and
    the control electrode is provided to not overlap the either one of the input electrode and the output electrode in a plan view of a plane where the control electrode is provided.

12. The display device according to claim 1, wherein the first branch portion, the second branch portion, the either one of the input electrode and the output electrode, and the another one of the input electrode and the output electrode are arranged in parallel along a direction vertical to a direction of extension of the second branch portion.

13. The display device according to claim 1, wherein
    the input electrode includes a third branch portion and a fourth branch portion,
    the third branch portion is used to input a signal to the first sampling transistor, and
    the fourth branch portion is used to input the signal to the second sampling transistor.

* * * * *